United States Patent
Yamamoto et al.

(10) Patent No.: US 10,875,198 B2
(45) Date of Patent: Dec. 29, 2020

(54) ROBOT SYSTEM

(71) Applicant: FANUC CORPORATION, Yamanashi (JP)

(72) Inventors: Tomoyuki Yamamoto, Yamanashi (JP); Nao Ooshima, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 85 days.

(21) Appl. No.: 16/141,173

(22) Filed: Sep. 25, 2018

(65) Prior Publication Data
US 2019/0099902 A1    Apr. 4, 2019

(30) Foreign Application Priority Data
Oct. 2, 2017 (JP) .................... 2017-192902

(51) Int. Cl.
| B25J 19/06 | (2006.01) |
| B25J 9/16  | (2006.01) |
| B25J 13/08 | (2006.01) |
| F16P 3/14  | (2006.01) |
| B25J 19/02 | (2006.01) |

(52) U.S. Cl.
CPC .......... B25J 19/06 (2013.01); B25J 9/1676 (2013.01); B25J 9/1697 (2013.01); B25J 13/089 (2013.01);
(Continued)

(58) Field of Classification Search
CPC ........ B25J 19/06; B25J 9/1697; B25J 9/1676; B25J 13/089; B25J 19/023; B25J 19/022;
(Continued)

(56) References Cited

U.S. PATENT DOCUMENTS

| 10,262,224 B1* | 4/2019 | Harguess ................ G06T 7/269 |
| 2005/0149231 A1* | 7/2005 | Pretlove ................ B25J 9/1671 |
| | | 700/264 |

(Continued)

FOREIGN PATENT DOCUMENTS

| JP | 62-277290 | 12/1987 |
| JP | 06-126685 | 5/1994 |

(Continued)

OTHER PUBLICATIONS

Notification of Reasons for Refusal dated Aug. 6, 2019 in Japanese Patent Application No. 2017-192902.

*Primary Examiner* — Khoi H Tran
*Assistant Examiner* — B M M Hannan
(74) *Attorney, Agent, or Firm* — Wenderoth, Lind & Ponack, L.L.P.

(57) ABSTRACT

To provide a robot system capable of ensuring safety while giving consideration to the occurrence of a trouble in image capture means. A robot system with a camera for monitoring a robot comprises: current position model generation means that generates a current position model for the robot based on current position data about the robot and robot model data about the robot; simulation image generation means that generates a simulation image of the robot viewed from the direction of the camera based on set position data about the camera, set position data about the robot, and the current position model; detection means that compares the simulation image and a monitoring image acquired from the camera to detect the robot in the monitoring image; and safety ensuring means that ensures the safety of the robot system if the detection means does not detect the robot in the monitoring image.

2 Claims, 3 Drawing Sheets

(52) U.S. Cl.
CPC ............... *F16P 3/14* (2013.01); *B25J 19/022* (2013.01); *B25J 19/023* (2013.01); *G05B 2219/37563* (2013.01); *G05B 2219/37572* (2013.01); *G05B 2219/39082* (2013.01)

(58) Field of Classification Search
CPC ..... B25J 9/1674; B25J 3/04; B25J 9/00; B25J 9/0081; B25J 9/16; B25J 13/00; F16P 3/14; F16P 3/142; G05B 2219/37572; G05B 2219/39082; G05B 2219/37563; G05B 2219/39; A47L 2201/00; G05D 1/00; G05D 2201/02; G05D 1/0274; G05D 1/0255; G05D 1/0246; Y10S 901/00; G06N 3/008; B62D 57/032
USPC .................................. 700/245, 250, 253, 257
See application file for complete search history.

(56) References Cited

U.S. PATENT DOCUMENTS

| | | | | |
|---|---|---|---|---|
| 2008/0154428 | A1* | 6/2008 | Nagatsuka | B25J 9/1656 700/258 |
| 2011/0311127 | A1* | 12/2011 | Mizutani | B25J 9/1676 382/153 |
| 2015/0158178 | A1* | 6/2015 | Burmeister | B25J 9/1676 382/203 |
| 2015/0217455 | A1* | 8/2015 | Kikkeri | B25J 9/1676 700/259 |
| 2015/0266182 | A1* | 9/2015 | Strandberg | B25J 9/1666 700/255 |
| 2015/0332463 | A1* | 11/2015 | Galera | G06K 9/00771 382/103 |
| 2016/0260027 | A1* | 9/2016 | Kuwabara | G06N 20/00 |
| 2016/0288318 | A1* | 10/2016 | Nakazato | B25J 9/1666 |
| 2018/0029230 | A1* | 2/2018 | Takahashi | B25J 9/1674 |
| 2018/0120804 | A1* | 5/2018 | Higuchi | G05B 19/0428 |
| 2018/0222050 | A1* | 8/2018 | Vu | B25J 9/1676 |

FOREIGN PATENT DOCUMENTS

| | | |
|---|---|---|
| JP | 7-100782 | 4/1995 |
| JP | 2009-159568 | 7/2009 |
| JP | 2012-61558 | 3/2012 |
| JP | 2012-187641 | 10/2012 |
| JP | 5523386 | 6/2014 |

* cited by examiner

ROBOT SYSTEM

This application is based on and claims the benefit of priority from Japanese Patent Application No. 2017-192902, filed on 2 Oct. 2017, the content of which is incorporated herein by reference.

BACKGROUND OF THE INVENTION

Field of the Invention

The present invention relates to a robot system.

Related Art

According to a safety function conventionally known, if a worker enters collaborative operating space while a robot is in the collaborative operating space allowing simultaneous entries of the robot and the worker, the operating speed of the robot is reduced compared to a speed at a time before entry of the worker into the collaborative operating space, for example. Other known functions include a function of generating a three-dimensional robot model from positional information or a model for a tool or a workpiece, and a function of detecting a target in an image acquired, for example, by an image determination sensor.

For example, patent document 1 discloses a technique intended to avoid collision between a worker and a robot in a working area. According to this technique, stationary object model information and robot model information are removed from distance information about a distance to an image capture target generated by image capture means, remaining model information is generated that is distance information about a distance from a remaining target determined by removing a stationary object and the robot from the image capture target to the image capture means, a distance between the remaining target and the robot is calculated based on the remaining model information and the robot model information, and the operating speed of the robot is reduced based on the calculated distance.

Patent Document 1: Japanese Patent No. 5123386

SUMMARY OF THE INVENTION

However, the technique of patent document 1 does not give consideration to the occurrence of a trouble in the image capture means. The occurrence of a trouble in the image capture means in the technique of patent document 1 may result in a failure to calculate a distance between the remaining target and the robot exactly, a failure to monitor an area around the robot, or erroneous detection of the operation of the robot as entry of a human.

To prevent erroneous detection of the operation of the robot as entry of a human, multiple cameras are required to be located around the robot. However, this requires a large number of steps for adjustment of a monitoring area, etc., increases system cost, or results in the occurrence of a blind spot around the robot.

According to the technique of patent document 1, a failure in a camera as the image capture means may be detected by making a comparison using the multiple cameras. However, using the multiple cameras itself causes cost increase. Additionally, displacement of the position or the posture of the camera as the image capture means occurring for some reason makes it impossible to monitor an area around the robot.

A method of monitoring an area around a robot using a laser sensor has been developed as a conventional technique. However, this method requires complicated process of determining the range of an area to be monitored.

The present invention is intended to provide a robot system capable of facilitating ensuring of safety at relatively low cost while giving consideration to the occurrence of a trouble in image capture means.

(1) A robot system according to the present invention is a robot system (robot system 1 described later, for example) with a camera (camera 21 described later, for example) for monitoring a robot (robot 51 described later, for example), comprising: current position model generation means (current position model generation unit 111 described later, for example) that generates a current position model for the robot based on current position data about the robot and robot model data about the robot; simulation image generation means (simulation image generation unit 112 described later, for example) that generates a simulation image of the robot viewed from the direction of the camera based on set position data about the camera, set position data about the robot, and the current position model; detection means (detection unit 113 described later, for example) that compares the simulation image and a monitoring image acquired from the camera to detect the robot in the monitoring image; and safety ensuring means (safety ensuring unit 114 described later, for example) that ensures the safety of the robot system if the detection means does not detect the robot in the monitoring image.

(2) In the robot system described in (1) (robot system 1 described later, for example), the detection means (detection unit 113 described later, for example) may comprise: detection area acquisition means (detection area acquisition unit 113A described later, for example) that acquires a detection area in which the robot is detected in the monitoring image; and entry detection means (entry detection unit 113B described later, for example) that monitors a range determined by excluding the detection area from the monitoring image to detect entry of a human or an object. If the entry detection means detects entry of a human or an object, the safety ensuring means (safety ensuring unit 114 described later, for example) may ensure the safety of the robot system.

(3) The robot system described in (1) or (2) (robot system 1 described later, for example) may further comprise: input means (input unit 31 described later, for example) for input of a detection expected area in which the robot is to be detected in the monitoring image acquired from the camera (camera 21 described later, for example); and storage means (storage unit 41 described later, for example) that stores the detection expected area input through the input means. The safety ensuring means (safety ensuring unit 114 described later, for example) may compare an area in which the robot is actually detected and the detection expected area, and if there is a difference exceeding a predetermined amount between the area in which the robot is detected and the detection expected area, the safety ensuring means may ensure the safety of the robot system.

According to the present invention, a robot system capable of ensuring safety while giving consideration to the occurrence of a trouble in image capture means can be provided.

DETAILED DESCRIPTION OF THE INVENTION

An embodiment of the present invention will be described in detail below by referring to FIGS. 1 to 3.

<1. Outline of Invention>

Figure 1:
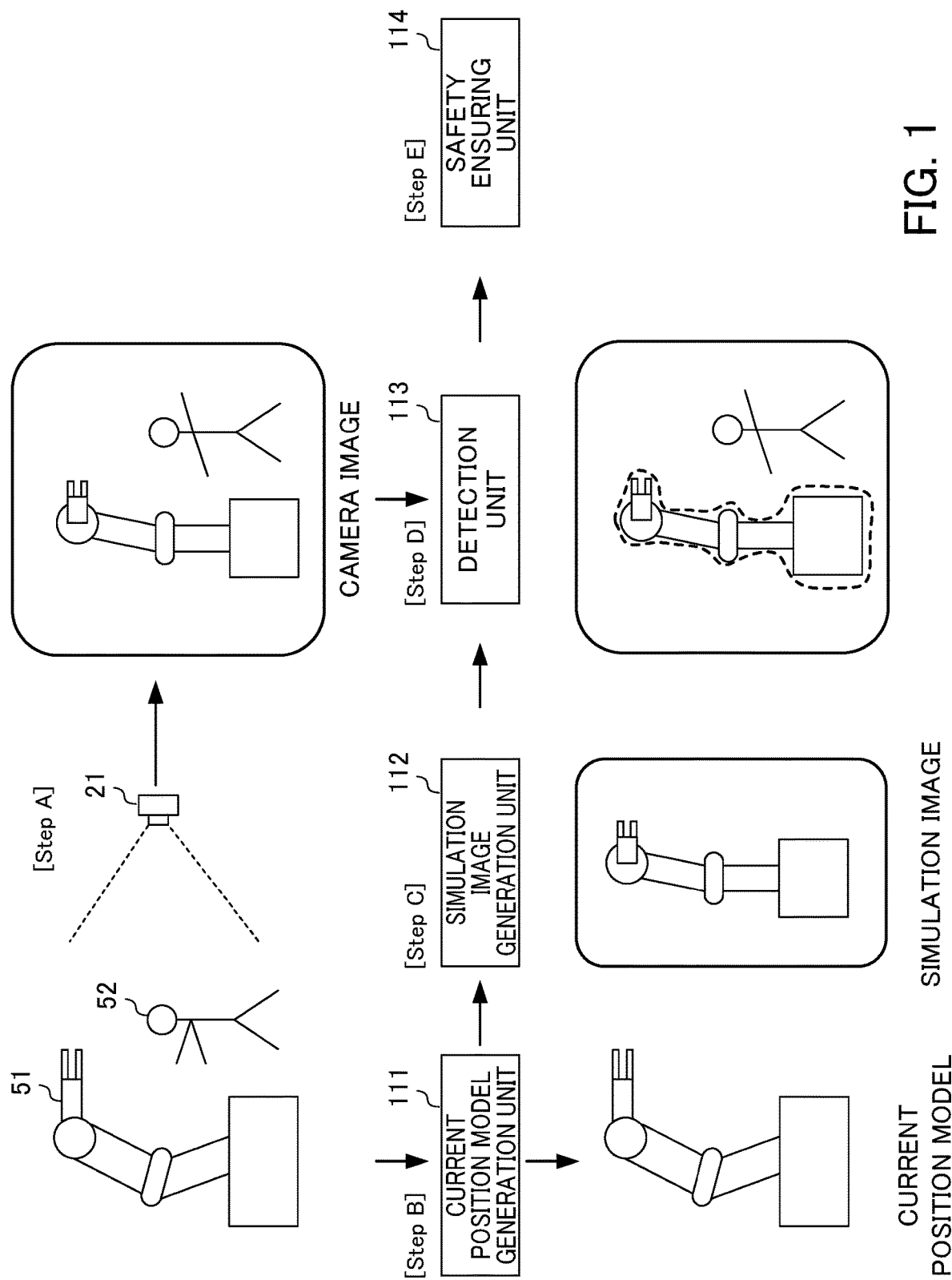
FIG. 1 explains the present invention in outline.

FIG. 1 explains the present invention in outline. A robot system 1 according to the present invention includes the following shown in FIG. 1 as some of components of the robot system 1: a camera 21, a current position model generation unit 111, a simulation image generation unit 112, a detection unit 113, and a safety ensuring unit 114.

In Step A, the camera 21 is located fixedly on the ground in such a manner that the robot 51 is within a monitoring area. As a result, a camera image such as an image shown in the upper right section of FIG. 1 is acquired as an area monitoring image. In the illustration of FIG. 1, an operator 52 exists near the robot 51, and the camera image includes both the robot 51 and the operator 52. However, this is not the limited illustration but is merely an example given for the convenience of description. The operator 52 may be omitted from the camera image.

In Step B, the current position model generation unit 111 acquires current position data about the robot 51 and a robot model as data about a three-dimensional model for the robot 51, and generates a current position model for the robot 51 based on these pieces of data. The "current position data" mentioned herein is data indicating a current positional relationship between mechanical elements forming the robot 51. The "current position model" mentioned herein is data about a three-dimensional model for the robot 51 and also about a three-dimensional model reflecting the current posture of the robot 51.

In Step C, the simulation image generation unit 112 acquires the foregoing current position model, set position data about the camera 21, and set position data about the robot 51. Further, the simulation image generation unit 112 uses these pieces of data to generate a simulation image that is image data to be acquired on the assumption that the robot 51 is currently viewed from the direction of the camera 21.

In Step D, the detection unit 113 compares the simulation image and the camera image to detect an image of the robot 51 in the camera image appearing in the simulation image.

If the detection unit 113 fails to detect an image of the robot 51, the safety ensuring unit 114 determines in Step E that a trouble has occurred such as a failure in the camera 21 itself, extraction of a cable of the camera 21, or displacement of the position of the camera 21 from a normal position, for example. Then, the safety ensuring unit 114 ensures the safety of the robot system 1. More specifically, the safety ensuring unit 114 stops the operation of the robot 51 or reduces the move speed of each part of the robot 51. The safety ensuring unit 114 may also ensure the safety of the robot system 1 not only f the detection unit 113 fails to detect an image of the robot 51 but also if the camera image includes a human or an object other than the robot 51 as shown in FIG. 1, and if the area of an image of the robot 51 in the camera image is displaced by a predetermined amount or more from a detection expected area set in advance.

Specifically, the robot system 1 according to the present invention compares a camera image of the robot 51 captured by the camera 21 and a simulation image generated based on a current position model for the robot 51, set position data about the camera 21, set position data about the robot 51, etc. If an image of the robot 51 appearing in the simulation image is missing from the camera image, the safety ensuring unit 114 ensures the safety of the robot system 1. Further, the robot, system 1 may disregard the operation of the robot 51, and may detect only a case where a human or an object other than the robot 51 enters a designated area around the robot 51. In FIG. 1, one robot 51, or two or more robots 51 may be provided. Further, one camera 21, or two or more cameras 21 may be provided.

<2. Configuration of Invention>

Figure 2A:
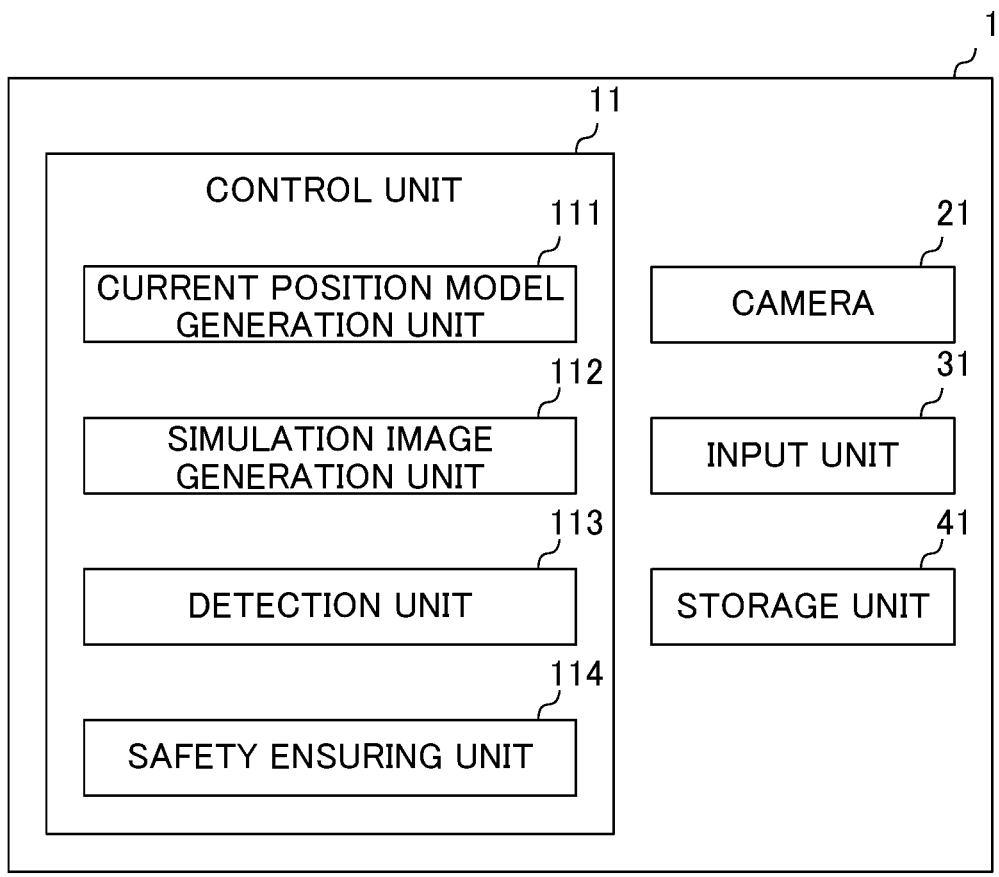
FIG. 2A is a functional block diagram of a robot system according to an embodiment of the present invention.
Figure 2B:
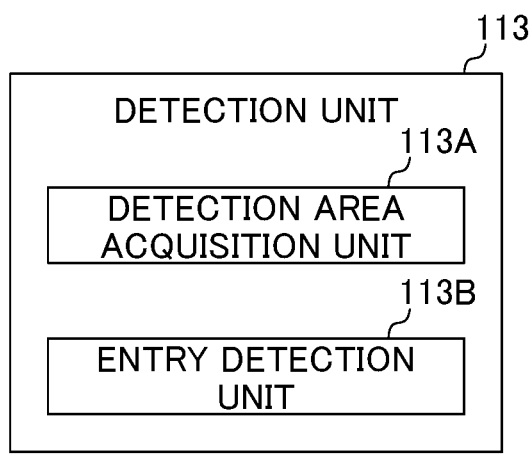
FIG. 2B is a functional block diagram of the robot system according to the embodiment of the present invention.

FIGS. 2A and 2B are functional block diagrams of the robot system 1 according to the present invention. The configuration of the robot system 1 will be described by referring to FIGS. 2A and 2B. A part of the configuration has already be described above and will be described repeatedly.

The robot system 1 includes a control unit 11, the camera 21, an input unit 31, and a storage unit 41. The control unit 11 includes the current position model generation unit 111, the simulation image generation unit 112, the detection unit 113, and the safety ensuring unit 114.

The control unit 11 may include a CPU, a ROM, a RAM, a CMOS memory, etc., for example. These are publicly-known parts for a person skilled in the art and are configured to be capable of communicating with each other through a bus. The CPU is a processor that controls the robot system 1 entirely. The CPU is configured in such a manner that the control unit 11 becomes functional as the current position model generation unit 111, the simulation image generation unit 112, the detection unit 113, and the safety ensuring unit 114 as shown in FIG. 2A by reading a system program and an application program stored in the ROM through the bus, and controlling the robot system 1 entirely by following the read system program and application program. The RAM stores various types of data such as temporary calculation data and display data. The CMOS memory is configured as a nonvolatile memory to be backed up by a battery not shown in the drawings and to hold its storage state even after the robot system 1 is powered off.

The current position model generation unit 111 acquires current position data about the robot 51 and a robot model as data about a three-dimensional model for the robot 51, and generates a current position model for the robot 51 based on these pieces of data. The current position model may be generated using a publicity-known technique. For example, the current position model for the robot 51 can be generated by acquiring the current position of each axis of the robot 51 and applying data about the acquired current position of each axis to the robot model.

The simulation image generation unit 112 acquires set position data about the camera 21, set position data about the robot 51, and the current position model for the robot 51 generated by the current position model generation unit 111. The simulation image generation unit 112 uses these pieces of data to generate a simulation image of the robot 51 currently viewed from the direction of the camera 21. The simulation image may be generated using a publicly-known technique. For example, the simulation image can be generated by locating the camera 21 and the robot 51 in virtual space in which a coordinate system is defined, and using the coordinate values of coordinates where the camera 21 and the robot 51 are located, data about the posture, the angle of view, etc. of the camera 21, and the current position model reflecting the current position and the current posture of the robot 51.

The detection unit 113 compares the simulation image generated by the simulation image generation unit 112 and a camera image as a monitoring image acquired from the camera 21 to detect the robot 51 in the camera image. A technique such as pattern matching may be used for this detection, for example.

If the detection unit 113 does not detect the robot 51 in the camera image, the safety ensuring unit 114 stops the operation of the robot 51 or reduces the move speed of each part of the robot 51, thereby ensuring the safety of the robot system 1 for the robot 51.

The camera 21 monitors the robot 51 and an area around the robot 51. One, or two or more cameras 21 may be provided.

The input unit 31 is a unit used by a user in inputting a detection expected area in which the robot 51 is to be detected in the camera image as the monitoring image acquired from the camera 21. The input unit 31 can be realized by a keyboard or a touch panel, for example. The storage unit 41 stores the detection expected area input through the input unit 31.

The safety ensuring unit 114 may compare an area in which the robot 51 is detected in the monitoring image by the detection unit 113 and the detection expected area stored in the storage unit 41. If there is a difference exceeding a predetermined amount between these areas, the safety ensuring unit 114 may ensure the safety of the robot system 1. If an average of distances between the respective contours of these areas is a predetermined value or more, for example, the safety ensuring unit 114 may ensure the safety of the robot system 1. In another case, if the area of a section where these areas do not overlap each other is a predetermined value or more, the safety ensuring unit 114 may ensure the safety of the robot system 1.

As shown in FIG. 2B, the detection unit 113 includes a detection area acquisition unit 113A and an entry detection unit 113B. The detection area acquisition unit 113A acquires a detection area in which the robot 51 is detected in the monitoring image. The entry detection unit 113B monitors a range determined by excluding the detection area acquired by the detection area acquisition unit 113A from the monitoring image to detect entry of a human or an object other than the robot 51.

The safety ensuring unit 114 may ensure the safety of the robot system 1 if the entry detection unit 113B detects entry of a human or an object other than the robot 51 in the monitoring image.

<3. Operation of Invention>

Figure 3:
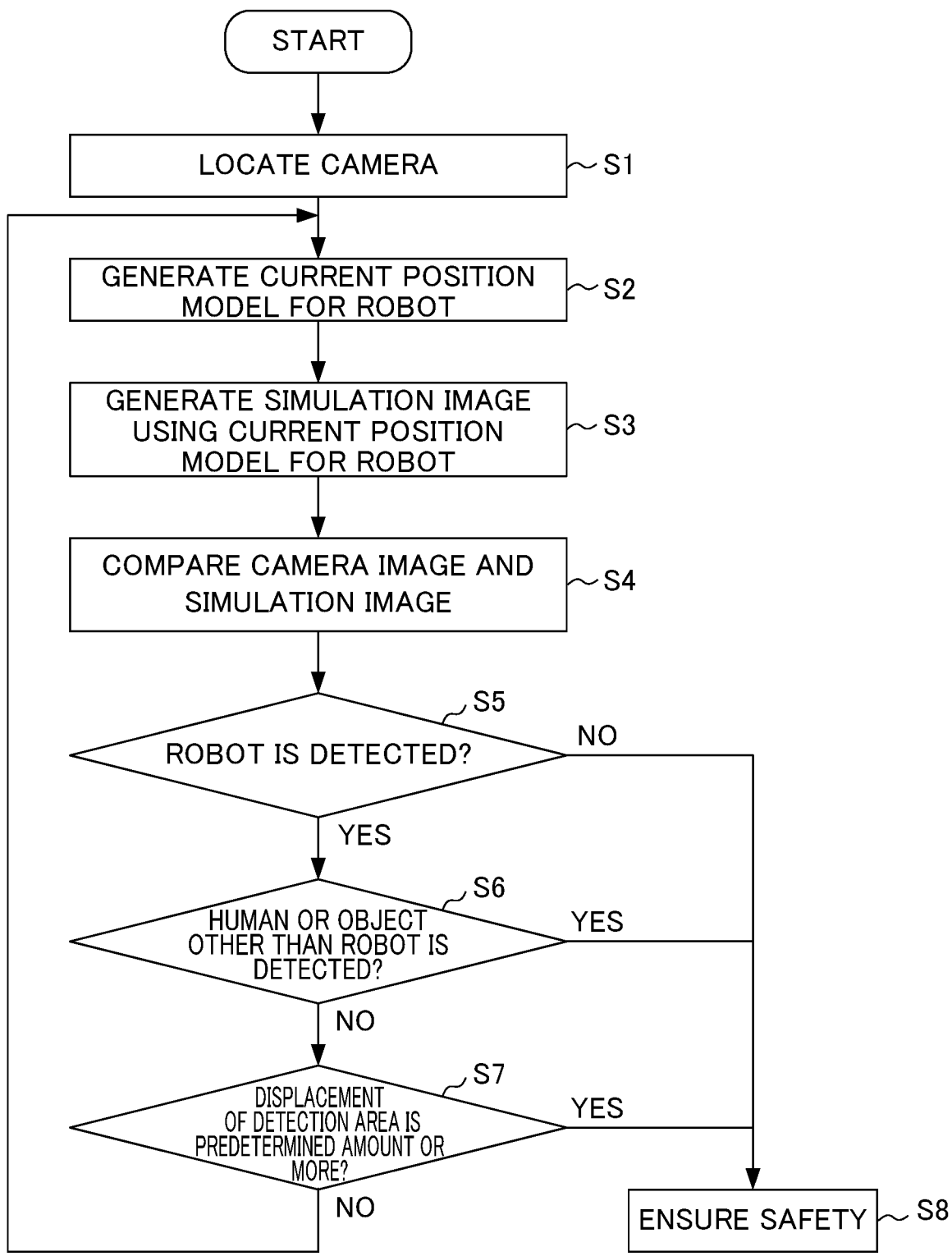
FIG. 3 is a flowchart showing the operation of the robot system according to the embodiment of the present invention.

FIG. 3 is a flowchart showing the operation of the robot system 1 according to the present invention. In step S1, a user locates the camera 21 in an area around the robot 51 in such a manner that the robot 51 is well within a monitoring image.

In step S2, the current position model generation unit 111 acquires current position data about the robot 51 and a robot model as data about a three-dimensional model for the robot 51, and generates a current position model for the robot 51 based on these pieces of data. Further, the current position model generation unit 111 transmits the generated current position model to the simulation image generation unit 112.

In step S3, the simulation image generation unit 112 acquires the current position model, set position data about the camera 21, and set position data about the robot 51. Then, the simulation image generation unit 112 uses these pieces of data to generate a simulation image that is image data to be acquired on the assumption that the robot 51 is viewed from the direction of the camera 21. Further, the simulation image generation unit 112 transmits the generated simulation image to the detection unit 113.

In step S4, the detection unit 113 compares the simulation image and a camera image to try to detect an image of the robot 51 in the camera image appearing in the simulation image.

In step S5, if the detection unit 113 detects the robot 51 (S5: YES), the processing goes to step S6. If the detection unit 113 does not detect the robot 51 (S5: NO), the processing goes to step S8.

In step S6, if the detection unit 113 detects a human or an object other than the robot 51 in a range in the camera image other than a range including the robot 51 (S6: YES), the processing goes to step 38. If the detection unit 113 does not detect a human or an object other than the robot 51 (S6: NO), the processing goes to step S7.

In step 37, if there is displacement of a predetermined amount or more between an detection expected area input in advance by the user and an area in which the robot 51 is actually detected in the camera image by the detection unit 113 (S7: YES), the processing goes to step S8. If there is no displacement of the predetermined amount or more between the detection expected area and the area in which the robot 51 is actually detected in the camera image by the detection unit 113 (S7: NO), the processing returns to step S2.

In step S8, the safety ensuring unit 114 ensures the safety of the robot system 1. More specifically, the safety ensuring unit 114 stops the operation of the robot 51 or reduces the move speed of each part of the robot 51.

As described above, the robot system 1 compares a camera image as a monitoring image acquired from the camera 21 with a simulation image generated based on a current position model for the robot 51, etc. Further, the robot system 1 determines whether an image of the robot 51 is detected in the camera image, whether a human or an object other than the robot 51 is detected in the camera image, or whether there is no displacement of a predetermined amount or more between the area of an image of the robot 51 detected in the camera image and an area expected in advance. Based on a result of the determination, the safety of the robot system 1 is ensured.

In this way, it becomes possible to ensure the safety of the robot system 1 while consideration is given to the occurrence of a trouble in the camera 21. As already described above, the conventional method of monitoring an area around a robot using a laser sensor requires complicated process of determining the range of an area to be monitored in this regard, according to the method of the present invention, a range being monitored by the camera 21 can be known at a glance to facilitate check of a monitoring area. According to the present invention, even if only one camera 21 is used for monitoring an area around the robot 51, a trouble in the camera 21 can still be detected.

<4. Modification>

For example, the robot system 1 may be configured in such a manner that, if the detection unit 113 becomes incapable of acquiring a camera image from the camera 21 for reason such as a switched-off state of the camera 21, extraction of a cable of the camera 21, or a disconnection of the cable of the camera 21, the robot system 1 issues an alarm.

Each unit in the foregoing robot system 1 can be realized by hardware, by software, or by a combination of hardware and software. A method of ensuring safety implemented by each unit in the foregoing robot system 1 can also be realized by hardware, by software, or by a combination of hardware and software. Being realized by software means being realized by reading and execution of a program by a computer.

The program can be stored using various types of non-transitory computer-readable media and can be supplied to a computer. The non-transitory computer-readable media include various types of tangible storage media. Examples of the non-transitory computer-readable media include a magnetic recording medium (a flexible disk, magnetic tape, or a hard disk drive, for example), a magneto-optical recording medium (a magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example). The program may also be supplied to a computer using various types of transitory computer-readable media. Examples of the transitory computer-readable media include an electrical signal, an optical signal, and an electromagnetic wave. The transitory computer-readable media can be used for supplying the program to a computer through wired communication paths such as a power cable and an optical fiber, or a wireless communication path.

EXPLANATION OF REFERENCE NUMERALS

1 Robot system
11 Control unit
21 Camera
31 Input unit
41 Storage unit
111 Current position model generation unit
112 Simulation image generation unit
113 Detection unit
113A Detection area acquisition unit
113B Entry detection unit
114 Safety ensuring unit

What is claimed is:

1. A robot system with a camera for monitoring a robot, comprising:

current position model generation means that generates a current position model for the robot based on current position data about the robot and robot model data about the robot;

simulation image generation means that generates a simulation image of the robot viewed from a direction of the camera based on set position data about the camera, set position data about the robot, and the current position model;

detection means that compares the simulation image and a monitoring image acquired from the camera to detect the robot in the monitoring image;

safety ensuring means that ensures a safety of the robot system when the detection means does not detect the robot in the monitoring image;

input means for input of a detection expected area in which the robot is to be detected in the monitoring image acquired from the camera; and storage means that stores the detection expected area input through the input means, wherein the safety ensuring means compares an area in which the robot is actually detected and the detection expected area, and when there is a difference exceeding a predetermined amount between the area in which the robot is actually detected and the detection expected area, the safety ensuring means ensures the safety of the robot system, and wherein the current position model is data about a 3-dimensional model for the robot.

2. The robot system according to claim 1, wherein the detection means comprises: detection area acquisition means that acquires the area in which the robot is actually detected in the monitoring image; and entry detection means that monitors a range determined by excluding the area from the monitoring image to detect entry of a human or an object other than the robot, and when the entry detection means detects entry of a human or an object, the safety ensuring means ensures the safety of the robot system.

* * * * *